UNITED STATES PATENT OFFICE.

WILLY MOELLER, OF HAMBURG, GERMANY, ASSIGNOR, BY MESNE ASSIGNMENTS, TO THE CHEMICAL FOUNDATION, INC., A CORPORATION OF DELAWARE.

PROCESS OF MAKING TANNING MATERIALS.

1,399,510.

Specification of Letters Patent. Patented Dec. 6, 1921.

No Drawing. Application filed March 14, 1916. Serial No. 84,246.

*To all whom it may concern:*

Be it known that I, WILLY MOELLER, a citizen of the German Empire, and resident of Hamburg, Germany, have invented new and useful Processes of Making Tanning Materials, of which the following is a specification.

My invention relates to a process of tanning and comprises a series of steps or manipulations which are hereinafter more fully set forth in the specification and claimed in the appended claims. These steps or manipulations, all of which coöperate or may be arranged to coöperate, in carrying out my new tanning process, may be briefly summarized as follows:

The employment of certain substances such as phlobaphenes and resins, as ingredients of synthetic tanning compounds, which substances possess tanning properties but have hitherto not been used in synthetic tanning compounds because they are insoluble, or only slightly soluble, in water, this employment being made possible by recognizing or regarding them as colloids, and adding thereto a suitable dispersion medium.

The employment in this connection of a dispersion medium, which is itself soluble in water, and may itself be, and preferably is, a substance having tanning properties.

The production of this colloidal mixture either by a direct addition of the colloid to the dispersion medium or by their conjoint simultaneous formation by a common chemical operation. These colloidal solutions differ from common solutions proper. Solutions proper have a wide range of solubility. The dissolved constituents may be dissolved in any proportion to the solvent within extended limits. Colloidal solutions in contradistinction thereto will not hold the dissolved constituent, if a slight alteration of the quantity of the solvent is effected.

The creation of insoluble, or but slightly soluble, tanning substances, by the oxidation of sulfonated and condensed carbon compounds and phenols (which carbon compounds and phenols I call in the claims hydrocarbon substitution products) and the use, for tanning purposes, of the substances formed by such oxidation.

The creation of new insoluble, or but slightly soluble, tanning substances by additional condensation to high molecular condition, of certain known soluble tanning substances produced by the condensation of carbon compounds, such as phenols, aldehydes, sulfonated phenols and sulfonated hydrocarbons.

My invention contemplates primarily the use for tanning purposes, of certain substances, such as the phlobaphenes, certain resins, waxes, asphalts, etc., and certain other substances hereinafter referred to as resinous substances which in themselves possess tanning properties but have not been deemed suitable for commerical tanning purposes because they are insoluble or only slightly soluble in water. I have found that by recognizing or regarding these substances as colloids, and dissolving them in a suitable dispersion medium, I may use them for commercial tanning purposes. While I believe these substances to be colloids, and to form colloidal solutions with the dispersion mediums hereinafter referred to, I desire it to be understood that my invention is operative, whether or not my view of the nature of these substances and of their mixtures is correct. Nevertheless, for the sake of convenience I shall hereinafter refer to the group of insoluble or slightly soluble substances hereinabove referred to as colloids, or as the colloid group.

As dispersion medium I may, and prefer to employ any of the resin-like, water-soluble, synthetic tanning substances which are produced by the condensation of phenols, aldehydes, sulfonated phenols, and sulfonated carbon compounds usually with the aid of formaldehyde as a condensing agent. All such substances now known to me are suitable for this purpose, but should any be unsuitable, I do not include them in my claims.

The colloidal solutions thus produced I employ for tanning in the usual manner.

I may employ, as one of the colloids of my process, any of the members of the above mentioned group of dispersion mediums when condensed to high molecular condition. That is to say, by continuing the condensation process, these water-soluble, somewhat weak and unsatisfactory tanning agents, are changed to insoluble, or almost insoluble, resin-like substances, which possess tanning advantages not possessed by such water-soluble substances, and may enter into colloidal solution with them.

The best method of making such tanning substances is first to condense any desired phenol or carbon compound to a resin-like insoluble condensation product with or without the addition of a condensing agent; after the completion of the reaction a certain excess of such phenol, or of any higher phenol or carbon compound, is added to the mixture.

However, the insoluble resin-like tanning material and the disperson medium may be produced as a mixture by a single process. This is done by using a single starting material, e. g. a phenol and condensing one portion to a less degree than the other; or by using two different starting materials, e. g. two different phenols. By varying the relative proportions of the phenol and formaldehyde on the one hand, and the sulfuric acid which transforms the free phenol into sulfo-acid on the other, a large variety of products may be obtained which contain soluble and insoluble bodies side by side. The degree to which the sulfuric acid is heated also plays an important part.

If, for instance, it is desired to increase the proportion of the water-insoluble substance (colloid) which is colloidably dissolved in the soluble substance (dispersion medium), the amount of formaldehyde used must be increased so that in this way more of the phenol is condensed to insoluble resin bodies. On the other hand if it is desired to increase the proportion of the soluble constituents (dispersion medium) the amount of phenol used must be much greater than that of the formaldehyde. Of course the amount of sulfuric acid to be added, as well as the conditions of the reaction, must be modified accordingly.

Primarily, always so much sulfuric acid is to be used that all as yet free phenol is transformed into sulfo acid. In order to continue the peptization, the mixture is to be heated until the desired degree of dispersion is attained, that is, until no aggregated dispersion takes place in water solution. Any phenol may be employed, univalent or multivalent, e. g. cresols or naphthols. Of course, it is also possible to use mixtures of these phenols for carrying out the peptization in one phase. The range of possible mixtures is very great, and the suitable conditions for the use of any particular mixture may readily be determined by experiment.

My invention contemplates further the production of synthetic tanning substances by the oxidation of sulfonated and condensed carbon compounds and phenols. While hitherto such synthetic tanning substances were produced by only sulfonating and condensing, it has now been discovered that by an additional oxidation new substances are produced which (at least without special aid) are with difficulty soluble in water (or perfectly insoluble, unless their chemical constitution is materially attacked and altered f. i. by treatment with sulfites of alkali), but are far better tanning materials, and possess a remarkable resemblance to the natural vegetable tanning materials, and, like them, give to leather a yellow or reddish color and a high weight.

Some of the substances thus produced are partly insoluble in water, but are made readily soluble to form colloidal solutions when mixed with other, directly soluble substances, and particularly with the dispersion mediums described above.

Such colloidal solutions of different tanning substances act therefore in the same manner and in contradistinction to solutions proper in the presence of acid, that is, when acid is added almost the entire tanning material is precipitated. In practice such mixtures are of particular importance, as the oxidized, difficultly soluble or insoluble tanning substances are better than those which are immediately soluble.

It may be noted that when phenolsulfoacids are employed as starting materials the blue coloring with iron chlorid no longer takes place, in fact no discoloration of any kind takes place. No discoloration takes place as the result of the iron chlorid reaction even when other starting materials are used. It is probable that in the case of the phenolsulfoacid the phenol group has by oxidation been converted into a chinon group, and the same may be true when carbon compounds are used as starting materials. It is known that chinon is a weak tanning agent.

A large number of substances may be employed as oxidizers, e. g. the oxygen of the air, ozone, peroxid of hydrogen, potassium bichromate, potassium permanganate, perchlorates, perborates, persulfates, chlorin, nitric acid and other oxidizing substances.

The examples hereinafter given will illustrate how these oxidizing substances, influence, according to their individual characteristics, (for instance by an attendant chromating, nitrating, chlorating, etc.), the tanning and coloring character of the final product.

It is quite probable that in addition to the oxidation, other constitutional changes take place which add to the tanning effect, for instance, because of the entry of nitro or chlorin groups, or the formation of chromium or manganese salts. Especially when persulfates are used, it is to be noted that these compounds may replace the sulfuric acid as condensation means, and at the same time act as oxidizers, so that the whole process of sulfonating, condensing and oxidizing may be carried on with such bodies in one phase. The oxidization is in such cases continued until samples show the desired qualities.

The intensive increase of tanning properties of the products so treated, compared with the tanning properties of products obtained by condensation only, and without oxidation, is apparent from the marked proportional increase in the former of those ingredients which may be absorbed by the skin. According to the method of treatment this increase of absorbable ingredients may be as high as 50%.

Thus this new process, in so far as oxidized, sulfonated and condensed hydrocarbons are already known, is based upon the recognition of their tanning properties, and upon their corresponding use in the tanning process, especially in admixture with immediately water-soluble tanning substances to make them water-soluble in turn.

In so far as the process of sulfonating, condensing and oxidizing is carried on with substances or mixtures which have not hitherto been treated in this manner, and new end products are thus obtained, the invention also consists in the production of these new products.

The same is true of the manner of carrying out the sulfonation, condensation and oxidation, which must have regard to the new end to be attained, especially by aiming at a high degree of condensation and as high a degree of oxidation as would correspond approximately to the chinon type. In so far as mixtures are used as starting materials, particularly mixtures of more or less easily condensable and more or less easily oxidizable substances, and are subjected to a process which affects the various substances in different ways, care should be taken not to carry the condensation and oxidation so far that the water solubility of the entire mixture is destroyed, at least not to the extent of preventing the restoration of such water-solubility by the addition of immediately soluble tanning materials.

The suitable dispersion conditions are extraordinarily different for the different means used. While small amounts of dispersion mediums suffice to dissolve larger quantities of some of the above-mentioned resin-like compounds, with little heating, other compounds require larger amounts of dispersion mediums, at higher temperature, and increased pressure, and the exclusion of air. The most suitable dispersion conditions are best determined by experience.

Thus the insoluble, resin-like condensation product is partly carried over into a colloidably-soluble condition by the added free phenol, and such water solutions act similarly to the vegetable tanning substances with high phlobaphene content.

Beside the free phenols other substances, such as the sulfoacids of the phenols, and the sulfoacids of the carbon compounds and the water soluble condensation products of these sulfoacids of the phenols and carbon compounds, all of them already known as tanning agents when used alone, may be used for converting the insoluble condensation products into colloidal condition.

The characteristic feature of all these colloidal tanning solutions, produced as above described, and consisting of the two components "insoluble tanning material, soluble dispersion medium" is mainly that the insoluble material, present in colloidal solution in the dispersion medium, is chemically unchanged and probably forms with the dispersion medium only a very loose complex addition product. Thus the insoluble substance may very easily be separated out of the tanning material in absolutely unchanged form by the addition of an acid precipitating means, whether an acid or an acid salt, and may again be brought into solution by the addition of an alkali or an alkaline salt. In the latter case a complete chemical change of course takes place.

These reactions are very similar to the corresponding reactions involving vegetable tanning substances, from which the insoluble ingredients are also precipitated by addition of an acid, and again brought into solution by the addition of an alkali. This is not the case with all other known artificial tanning substances, which do not precipitate insoluble ingredients when acid is added; thus showing that they are substances of an entirely different nature from those involved in this invention.

My invention will now be illustrated by means of specific examples, but it will be understood, of course, that those illustrations are not intended to be considered as limiting my invention.

I do not claim the vegetable tanning agents as such, nor the use of these materials, *per se*, in tanning.

*Example 1.*

Formaldehyde or bodies furnishing formaldehyde by splitting is mixed with phenol in molecular proportions and the mixture is heated at temperatures raised to the boiling point of the mixture and allowed to react. The insoluble resin-like product obtained is treated in finely pulverized condition with a heated water solution of phenol of any ordinary concentration, the mass being heated meanwhile; the treatment is continued until the phenol solution becomes concentrated to the desired degree and is thus made useful for tanning purposes. The end of the solution process is recognized by the fact that upon cooling the solution a partial separation of the resinous product out of the phenol solution takes place. The application of these tanning means follows the known methods according to the kind of tan liquors in the tan pits or casks.

*Example 2.*

Formaldehyde or bodies splitting off formaldehyde is mixed in molecular proportions with phenol and the mixture is allowed to react at temperatures up to the boiling point of the reaction products. This resinous body is slowly added to a very weak phenol solution, which is present in a tanning cask, the solution being stirred and slightly warmed, until no more of the resinous product is taken up by the phenol solution. Now the skin to be tanned is placed in the tanning casks and the latter are rotated until the greater part of the resin-like product has been taken up by the skin or hide.

Afterward phenol solution and pulverized resin are again placed in the cask in the stronger amount and this process is repeated under continued rotation of the cask until the desired tanning effect is attained.

*Example 3.*

Formaldehyde or bodies splitting off formaldehyde are caused to react with cresol, with moderate warming, until the total mass is converted into an insoluble resinous body. As much of this resinous finely pulverized product is introduced into a water solution of phenol sulfonic acid of definite concentration, heat being applied meanwhile, as this solution is able to take up. The further use of this product as a tanning means follows the procedure pointed out in Examples 1 or 2.

*Example 4.*

1 kilogram of that condensation product which is produceable as a water soluble product by treatment of naphthalin, formaldehyde and sulfuric acid under suitable conditions, is brought into solution by heating with 1 kilogram of water. To this is added in pulverized form one-half kilogram of such insoluble condensation product as might be produced from alpha or beta naphthol treated with formaldehyde under higher temperature conditions according to known processes. This mixture is warmed under pressure to about two atmospheres and the solution is poured off from the undissolved condensation product. The application of the product as a tanning means is in accordance with Example 1.

It has been further found that all known vegetable and bituminous resins, waxes, asphalts and similar natural substances can be transformed into tanning agents by dispersion in colloidal solution.

As natural bodies those also should be included which may be transformed into high-molecular bodies out of vegetable or bituminous resin-like oils, balsams, solid and fluid carbon compounds, this transformation being effected by further treatment either with formaldehyde or other condensation means; furthermore, also those products which may be produced from vegetable tanning stuffs of any kind by further condensation by means of formaldehyde or bodies splitting off formaldehyde with or without the use of acids.

As dispersion means may be mentioned the free phenols or their sulfo-acids, also the water soluble condensation products of phenols, and formaldehyde and hydrocarbons as well as their sulfoacids.

In accordance with the process the selected natural resins, waxes or asphalts are treated, under warming, with a water solution of the mentioned dispersion means until the solutions take up the dispersion means to the desired degree of concentration.

The characteristics of the tanning solutions obtained are similar to those of the vegetable in that the insoluble bodies are separated out by a precipitating agent, while alkalis bring these compounds into solution again.

*Example 5.*

Into 1 kilogram of a 20% water solution of phenol is gradually introduced 100 grams of ordinary colophony in pulverized condition, the solution being heated meanwhile up to 100° C. After the mixing is effected the temperature is raised, a pressure of 2 atmospheres being applied. The solution, after being cooled, is decanted from the undissolved colophony remaining and this solution is employed as tanning means in the well known manner in pits or casks.

*Example 6.*

100 grams of paraffin is treated under pressure with 200 grams of a concentrated water solution of a product which is obtainable as a water soluble product by treating naphthalin in a known manner with formaldehyde and sulfuric acid. The method of application is as already given.

*Example 7.*

A water solution of any of the known vegetable tanning stuffs, for example quebracho, is mixed with sufficient formaldehyde dissolved in water to completely transform the whole of the tanning stuffs into an insoluble resinous form. The condensation is accelerated by the addition of acid. After washing out with water, as much of a water solution of phenol sulfo acid is added to this condensation product as is necessary to fully transform it with a colloidal solution. The further employment as a tanning means follows exactly the known process indicated for vegetable tanning stuffs.

Example 8.

Formaldehyde or bodies splitting off formaldehyde are caused to react with heavy oils obtained from wood distillation and the resin-like condensation product obtained is treated with a sufficient quantity of a water solution of naphthalin sulfoacid to produce a complete transformation into the colloidal solution form. The employment as tanning means is as given above.

Example 9.

For the simultaneous production of an insoluble tanning means and of dispersion means, the following process may be employed:

2 parts of phenol are heated with one part of formaldehyde at a temperature of 120° C. until a test portion when poured into cold water shows considerable separations of resin-like compounds.

To the mixture, which still contains an unacted upon excess of phenol, is added 1 part of sulfuric acid and the result is heated until a test portion, when poured into cold water, shows a colloidal opalescent solution without separation, as by setting out, of resinous compounds.

The solution is so sensitive that upon the slightest addition of acid the colloidal condition of the insoluble compounds is destroyed.

Example 10.

Equal parts of phenol or cresol are mixed with concentrated sulfuric acid, the mixture being stirred meanwhile. The mixture heated by the heat of the reaction is cooled and then acted upon by a 40% formaldehyde solution, added in an amount which is 15% of the amount of the reacted phenol or cresol and sulfuric acid. The reaction mixture diluted with water to a specific weight of 1.17 is treated with concentrated nitric acid, first in the cold and then while being warmed, until the dilute water solution no longer shows a blue coloration with iron salt solutions. For the purpose of applying this product for tanning, the greater part of the excess acid is first neutralized with any alkali and the solution is diluted with water to the liquor strength usually employed in vegetable tanning processes.

The unhaired skin prepared in accordance with known methods for the tanning process is suspended in these solutions or treated in the tanning cask until it becomes completely tanned through by these solutions. The leather obtained is of great strength and is of a brown-yellow color.

Example 11.

Equal parts of phenol or cresol are mixed with concentrated sulfuric acid by stirring and the mixture is treated with formaldehyde in the same manner as is set forth in Example 10. The reaction product is heated in the water bath with a 20% water solution of potassium bichromate until these solutions no longer show a blue coloration with iron salts. The application for tanning purposes is the same as given in Example 10. The leather shows a straw-yellow color, adapted more particularly for purposes less harsh than those for which the leather obtained in accordance with Example 10 is adapted.

Example 12.

40 parts of phenol or cresol are heated on the water bath with 40 parts of potassium persulfate and 20 parts of water, and to this mixture is added 10% formaldehyde. After the reaction has terminated 80 parts of the obtained compound are mixed with 20 parts of potassium persulfate and the mixture is heated to about 120° C. until the water solutions of the resulting products give no blue coloration with iron salts. For tanning purposes the solution is almost completely neutralized; the tanning of hides follows, after suitable preliminary treatment, the known processes of vegetable tanning. The leather obtained is light reddish in color and has great strength.

Example 13.

Equal parts of naphthalin and concentrated sulfuric acid are heated to 140° C. After the sulfonation has taken place, there is slowly added to and stirred into the mixture a 40% formaldehyde solution in an amount which is 10% of the amount of the sulfonated naphthalin. This reaction mixture is diluted with water to a specific weight of 1.15 and into this solution chlorin gas is introduced until the point of complete saturation has been reached, such point being recognized when no more chlorin is absorbed by the solution. The excess chlorin is removed by cooking the solution a half hour and then the excess acid is neutralized by alkali to a point of weak acid reaction. The tanning means obtained is rather difficultly soluble in water, but can be mixed for tanning purpose with solutions of known water soluble tanning means.

The application of these solutions for tanning follows the known processes of vegetable tanning and by it is produced leather which is yellow in color.

Example 14.

A water solution of a tanning means such as can be obtained from acid resins in accordance with German Patent No. 262333 is mixed with a 20% potassium permanganate solution by stirring on a water bath until the red color of the permanganate solution no longer disappears after a few minutes. This solution is neutralized with alkali to a weakly acid reaction and is employed for tanning in accordance with the generally used processes for vegetable tanning.

Example 15.

Formaldehyde and phenol in molecular proportions are allowed to react on each other; the mixture produced is heated to the boiling point and meanwhile air is conducted into it until the reaction mixture becomes completely insoluble in water.

A second portion of phenol or even cresol is heated with an equal portion of sulfuric acid to a temperature of 120° C. After the sulfonation has terminated the reaction mixture is cooled and mixed with 40% formaldehyde solution, the formaldehyde solution being added in an amount equal to 15% of the amount of the reaction mixture, this being accompanied by the strong self-heating of the reaction mixture. This product, which is easily soluble in cold water, is mixed, while being heated, with as much of the first obtained insoluble product as the water soluble product is capable of taking up, until a colloidal solution is completely formed.

This solution is treated, while being warmed, with a water solution of hydrogen peroxid until it shows no longer a blue color with iron salts. The substance thus obtained in insoluble form is altered by further additions of the water soluble reaction mixture to the extent that the solution is obtained in a collodially soluble form. The application of these tanning means, after neutralization up to the point of weak acid reaction, follows the known vegetable tanning processes.

Example 16.

2 parts of a suitable uni- or polyvalent phenol or a mixture of the same are heated with one part of formaldehyde at a temperature of 120° C. until the odor of formaldehyde disappears and a corresponding condensation takes place. The end of the heating period can further be recognized when the product shows a greater or less separation of resinous compounds when poured into cold water.

To the reaction mixture which still contains large amounts of phenol not acted upon, 1 part of sulfuric acid is added and the result is heated at temperatures up to 120° C. until a test portion of the mixture, when poured into cold water, also in strong solutions up to a specific weight of 1.13, also upon long standing shows no separation by settling out of resinous compounds. In the present process the solution should be cloudy or opalescent and of a colloidal nature. Upon the smallest addition of acid, the insoluble compounds which are in colloidal condition will precipitate out as a thick resinous precipitate.

Now what I claim and desire to secure by Letters Patent is the following:

1. The preparation of a tanning agent which comprises condensing a derivative of an aromatic hydrocarbon to an insoluble condensation product, and subsequently oxidizing said condensation product until a substantially water soluble material is obtained.

2. The preparation of a tanning agent which comprises condensing a hydroxyl derivative of an aromatic hydrocarbon to an insoluble condensation product, and subsequently oxidizing said condensation product until a substantially water soluble material is obtained.

3. The preparation of a tanning agent which comprises condensing a phenolic derivative of an aromatic hydrocarbon to an insoluble condensation product, and subsequently oxidizing said condensation product until a substantially water soluble material is obtained.

4. The preparation of a tanning agent which comprises condensing a phenol in the presence of formaldehyde and subsequently oxidizing said condensation product until a substantially water soluble material is obtained.

5. The preparation of a tanning agent which comprises condensing a phenol in the presence of sulfuric acid and formaldehyde and subsequently oxidizing said condensation product until a substantially water soluble material is obtained.

6. The preparation of a tanning agent which comprises condensing a phenol in the presence of sulfuric acid and formaldehyde and subsequently oxidizing said condensation product in the presence of a persulfate until a substantially water soluble product is obtained.

7. The preparation of a tanning agent which comprises condensing a phenol in the presence of sulfuric acid and formaldehyde and subsequently oxidizing said condensation product by means of potassium persulfate until a substantially water soluble product is obtained.

That I claim the foregoing as my invention, I have signed my name this 10th day of April, 1916.

WILLY MOELLER.